United States Patent [19]

Ohta et al.

[11] Patent Number: 4,926,182
[45] Date of Patent: May 15, 1990

[54] MICROWAVE DATA TRANSMISSION APPARATUS

[75] Inventors: Tomozo Ohta, Ikoma; Hiroshi Nakano, Tenri; Kazutada Higashi, Tenri; Hirohiko Yamamoto, Tenri, all of Japan

[73] Assignee: Sharp Kabushiki Kaisha, Osaka, Japan

[21] Appl. No.: 55,363

[22] Filed: May 29, 1987

[30] Foreign Application Priority Data

May 30, 1986 [JP]  Japan ................................ 61-126729
May 30, 1986 [JP]  Japan ................................ 61-126730

[51] Int. Cl.$^5$ ............................................ G01S 13/80
[52] U.S. Cl. ........................................ 342/44; 342/51
[58] Field of Search ............................. 342/44, 42, 51

[56] References Cited

U.S. PATENT DOCUMENTS

| | | | |
|---|---|---|---|
| 3,362,025 | 1/1968 | Mori | 342/44 |
| 3,366,952 | 1/1968 | Mori | 342/44 |
| 3,488,655 | 1/1970 | Fortner | 342/44 |
| 3,774,205 | 11/1973 | Smith et al. | 342/44 |
| 3,878,528 | 4/1975 | Majeau | 342/44 |
| 4,068,211 | 1/1978 | Van Tol | 342/44 |
| 4,068,232 | 1/1978 | Meyers et al. | 342/44 |
| 4,121,102 | 10/1978 | Wilson | 342/44 X |
| 4,196,418 | 4/1980 | Kip et al. | |
| 4,242,661 | 12/1980 | Henoch et al. | 342/44 |
| 4,303,904 | 12/1981 | Chasek | 342/44 X |
| 4,390,880 | 6/1983 | Henoch | 342/50 |
| 4,466,125 | 8/1984 | Kanayama | 342/44 X |
| 4,471,344 | 9/1984 | Williams | 342/44 |
| 4,510,495 | 4/1985 | Sigrimis et al. | 342/44 |
| 4,588,880 | 5/1986 | Hesser | 342/50 X |
| 4,641,374 | 2/1987 | Oyama | 342/51 X |
| 4,647,931 | 3/1987 | Mawhinney | 342/44 |

FOREIGN PATENT DOCUMENTS 0558130  7/1982  Australia .
2048600  12/1980  United Kingdom .

OTHER PUBLICATIONS

"A Radiation Powered Single Chip EEPROM ID Code Transceiver", by J. G. Nolan et al., IEEE 1987, Custom Integrated Circuits Conference, May 4–7, 1987, pp. 684–686.
"Automatic Vehicle Identification Technology and Applications", by D. J. Reitz, 35th IEEE Vehicular Technology Conference, May 21–23, 1985, pp. 285–291.
"Short-Range Radio Telemetry for Electronic Identification, using Modulated RF Backscatter", by Alfred S. Koelle et al, Proceedings of IEEE, Aug. 1975.
Copy of European Search Report.
Copy of Annex to European Search Report.

Primary Examiner—Thomas H. Tarcza
Assistant Examiner—John B. Sotomayor

[57]  ABSTRACT

A microwave data transmission apparatus adapted to transmit and receive information by microwaves, which the identification tag is made smaller in size and lighter in weight to considerably improve the convenience in setting operation for use in many applications, can be applied for the production control within the factory or the control for entering and leaving the room by a person having an identification tag.

9 Claims, 4 Drawing Sheets

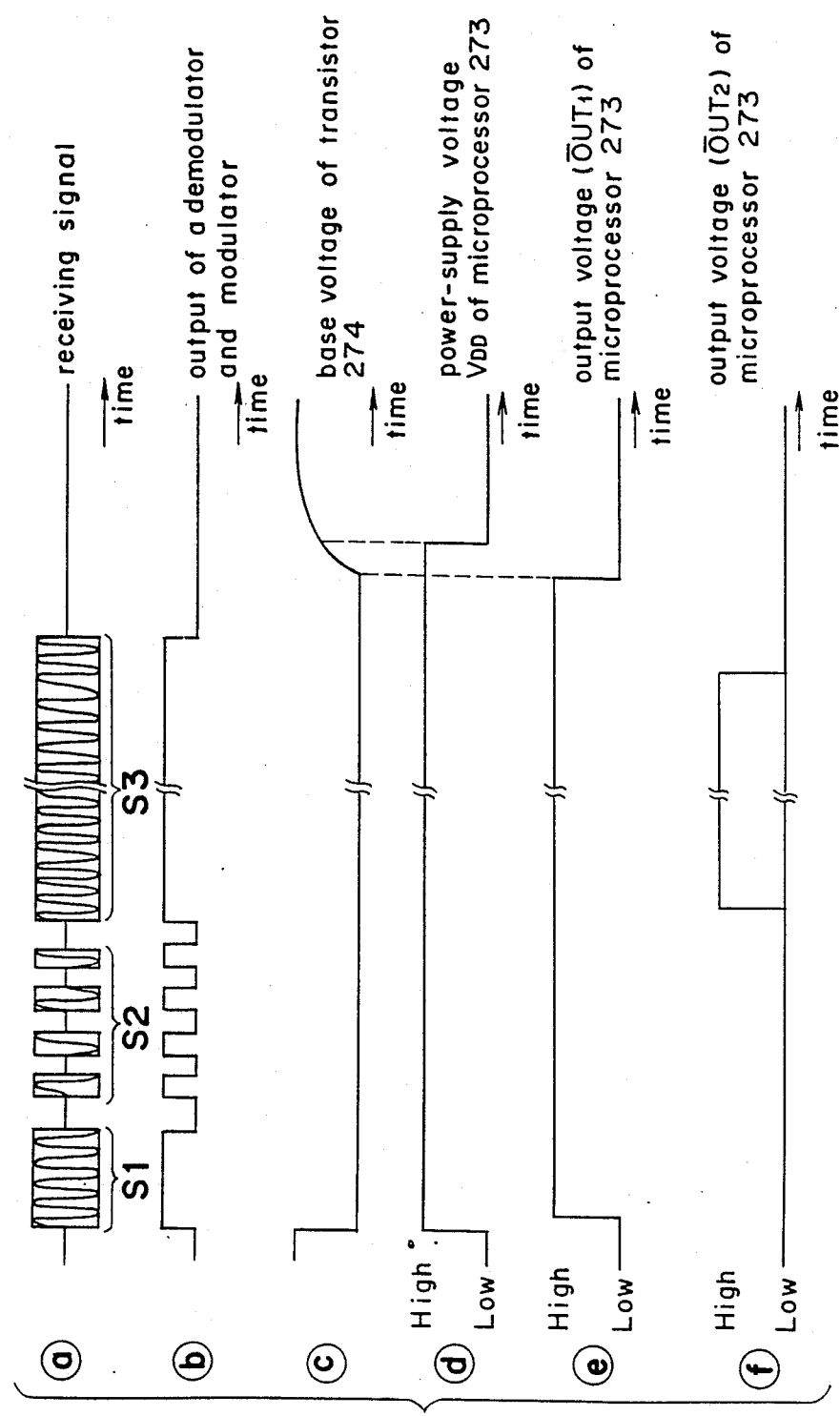

MICROWAVE DATA TRANSMISSION APPARATUS

BACKGROUND OF THE INVENTION

The present invention relates to a microwave data transmission apparatus which is adapted to transmit and receive information by microwave.

Conventionally, the construction shown in FIG. 7 is used as a microwave data transmission apparatus for transmitting and receiving information by microwave.

In FIG. 7, an identification tag 2 is adapted to answer the fixed information stored therein through the microwave signal waves with respect to a interrogator 1 when the interrogator 1 asks a question through the microwave signal radio waves with respect to an identification tag 2. The interrogator has therein a signal generator 3 for generating the microwave signals, a transmitting antenna 4 for transmitting into the air as the waves the signals coming from the signal generator 3, a receiving antenna 5 for catching the waves fed from the identification tag 2, and a demodulator 6 for demodulating the microwaves coming from the receiving antenna 5. Also, the identification tag 2 has a receiving antenna 7 for catching the waves fed from the interrogator 1, a demodulator 9 for demodulating the microwaves caught by the receiving antenna 7, a signal generator 10 for causing the carrier waves of the microwave band, a code generator 11 for fixedly storing the code information to generate the code information signals in accordance with the outputs of the demodulator 9, a mixer 12 (which may be a modulator) for mixing the code information signals fed from the code generator 11 with the carrier-wave signals fed from the signal generator 10, and a transmitting antenna 8 for transmitting the output signals of the mixer 12.

In the conventional microwave data transmission apparatus of the above-described construction, the signals obtained from the signal generator 3 within the interrogator 1 are transmitted towards the identification tag 2 from the transmitting antenna 4. The transmission signals are received by the receiving antenna 7 of the identification tag 2 and continuously demodulated by the demodulator 9. The signal after the demodulation functions as a controlling signal for controlling the code generator 11 and the signal generator 10. The code information signals are fed into the mixer 12 from the code generator 11 by the control of the signals after the demodulation. Also, the carrier waves of the microwave band are fed into the mixer 12 from the signal generator 10. In the mixer 12, the carrier waves of the microwave band are modulated by the code information signal. The modulated signals are transmitted into the air with the waves towards the interrogator 1 by the transmitting antenna 8 of the identification tag 2. In the interrogator 1, the waves from the identification tag 2 are received by the receiving antenna 5, and the fixed information stored in advance in the identification tag 2 is fetched through the demodulation by the demodulator 6.

However, as a signal generator 10 for transmitting the carrier waves of the microwave band is necessary without fail within the identification tag 2 in the above-described microwave data transmission apparatus, a power-supply apparatus of comparatively large capacity is provided for the driving operation of the signal generator 10. Thus, the construction of the identification tag 2 is rendered more complex and larger in size.

Also, in the conventional apparatus, no consideration is given to change the memory contents of the code information in the code generator 11, thus resulting in an extreme limitation to flexibility and application.

SUMMARY OF THE INVENTION

Accordingly, an object of the present invention is to provide an improved microwave data transmission apparatus, wherein the identification tag is made smaller in size and lighter in weight, to considerably improve the convenience in the setting operation for use in many applications.

In accomplishing the above-described object, according to the present invention, there is provided a microwave data transmission apparatus having a interrogator provided with a transmitting means for transmitting microwave signals having a modulation period and a non-modulation period, and a receiving means for receiving microwave signals, and an identification tag provided with a transmitting means for detecting the microwave signals sent from the interrogator to give the modulation based on the data of the memory portion with respect to the carrier wave during the non-modulation period of the microwave signals to transmit the microwave signals after the modulation with respect to the interrogator.

BRIEF DESCRIPTION OF THE DRAWINGS

These and other objects and features of the present invention will become apparent from the following description taken in conjunction with the preferred embodiment thereof with reference to the accompanying drawings, in which:

FIG. 4(a) to FIG. 4(f) is a wave-form diagram related to FIG. 1;

DETAILED DESCRIPTION OF THE INVENTION

Figure 1:
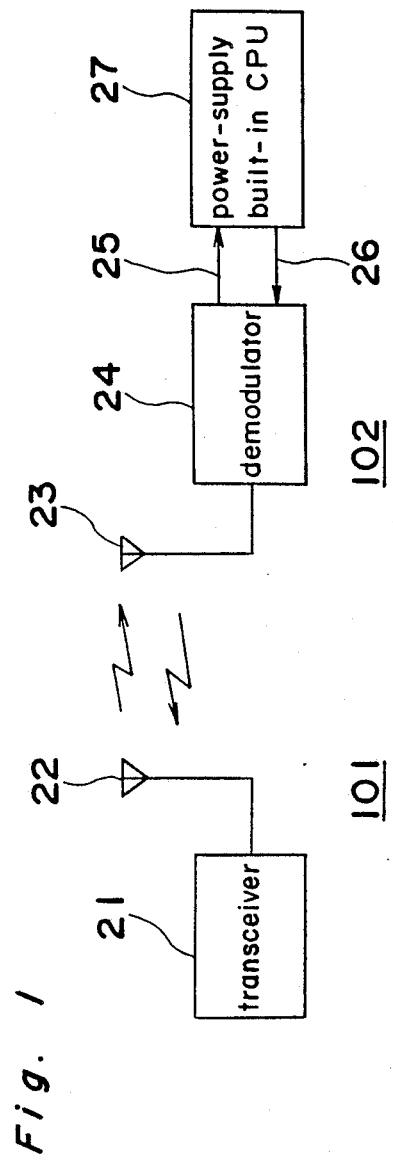
FIG. 1 is a circuit block diagram of a microwave data transmission apparatus in accordance with a first embodiment of the present invention.

Before the description of the present invention proceeds, it is to be noted that like parts are designated by like reference numerals throughout the accompanying drawings.

Embodiment 1

FIG. 1 shows a block circuit diagram of a first embodiment of a microwave data transmission apparatus in accordance with the present invention.

Referring now to the drawings, there is shown in FIG. 1, a microwave data transmission apparatus, which includes a interrogator 101 composed of a transceiver 21 and a transceiving antenna 22, an identification tag 102 including a transceiving antenna, a demodulator and modulator 24, a receiving signal line 25, a transmitting signal line 26, and a power-supply built-in CPU 27. It is to be noted that the receiving signal line 25 and the transmitting signal line 26 may be used by the same signal line.

Figure 2:
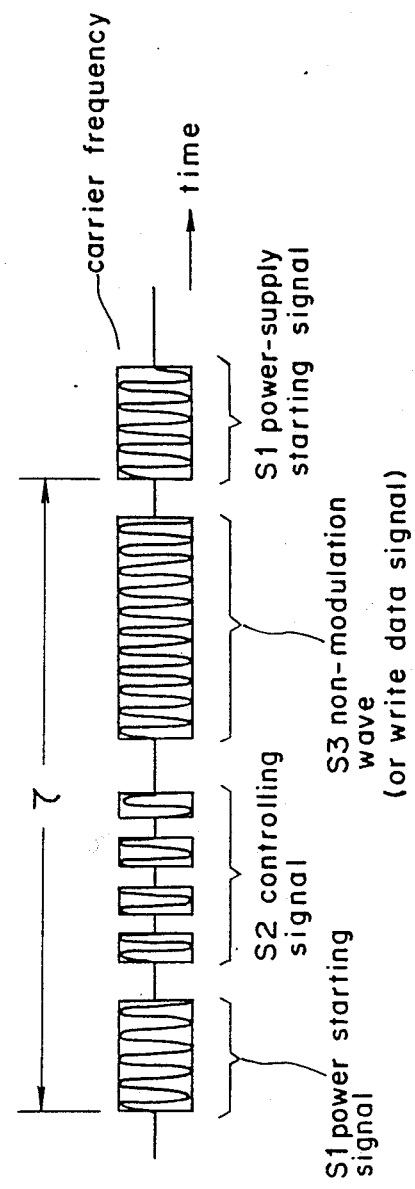
FIG. 2 is a wave-form diagram related to FIG. 1.

Also, FIG. 2 shows the waveform chart of the signal wave to be radiated to the identification tag 102 from the interrogator 101. As shown in FIG. 2, the signal wave is composed of a power starting signal S1, a controlling signal S2, and a non-modulation wave S3 (of storing data or the like), so that the signal wave is repeatedly radiated at the period $\tau$.

The operation is as follows in the above-described microwave data transmission apparatus.

First, a series of signal waves are radiated, which are repeated at the period $\tau$ shown in FIG. 2 from the transceiving antenna 22 of the interrogator 101. The power starting signal S1 is one for starting the power supply of the power built-in CPU 27 of the identification tag 102. As the identification tag 102 is mounted on the vehicle, baggage or the like for a moving operation, the power supply is not required to be normally kept started. In order to make the identification tag 102 smaller in size, the power consumption should to be smaller. Also, as the interrogator 101 is adapted to be used in fixed specified positions near the gate of the parking lot, a robot of a production line or the like, the power supply of the identification tag 102 is sufficient if the starting operation is performed only in a surveillance region called the range, over which the radiating waves of the interrogator 101 reach. Control the power consumption is controlled to minimum outside of the region and the power consumption may thus be saved.

Then, the controlling signal S2 following the power starting signal is a signal for conveying to the power supply built-in CPU 27 whether the instruction content of the interrogator 101 is the reading of data stored within the memory of the power supply built-in CPU 27 or is data being stored in the memory. If the controlling signal S2 is the read controlling signal of the data within the memory, then non-modulated waves of a constant length are transmitted, following the controlling signal S2. Also, if the controlling signal S2 is the write controlling signal into the memory, the writing data are transmitted, following the controlling signal S2. If the CPU is designed so that the CPU may perform the reading operation only with the power starting signal S1, the controlling signal for reading use may be omitted.

FIG. 2 shows how a series of signals are produced through amplification modulation of the carrier wave of a frequency f. Frequency modulation or phase modulation may be used as the method of the modulation with respect to the carrier wave of the frequency f.

A series of signals, shown in FIG. 2, radiated from the interrogator 101 are received by the transceiving antenna 23 of the identification tag 102, and each of the signals is demodulated by the demodulator and modulator 24 so that it is transmitted into the power-supply built-in CPU 27 through the receiving signal line 25. The power-supply built-in CPU detects the demodulated power starting signal S1 to start the power supply, and sequentially fetches the data stored within the memory if the controlling signal S2 being continuously fed is a read signal driving the demodulator and modulator 24 in accordance with the data contents over the transmitting signal line 26. The non-modulated waves received from the transceiving antenna 23 following the controlling signal S2 by the driving operation are modulated by the reading data, which are read from the memory of the power-supply built-in CPU 27, and are radiated again from the transceiving antenna 23. The waves which are demodulated and re-radiated by the demodulator and modulator 24 are received by the transceiving antenna 22 of the interrogator 101 and are demodulated by the transceiver 21.

On the other hand, when the controlling signals S2 following the power starting signals S1 are write signals, the writing data signals being sent following the controlling signals S2 are fed into the power-supply built-in CPU 27 through the receiving signal line 25, and are written into a given region of a memory for the storing operation.

The data transmitting operation of the optional information writing or reading is performed by a series of operations with respect to the identification tag from the interrogator 101. Also, the identification tag 102 is adapted to start the power supply only when it is located in the surveillance region of the interrogator 101, and to automatically turn off the power supply, except for that case to provide the condition "start waiting" so as to save the power consumption.

Figure 3:
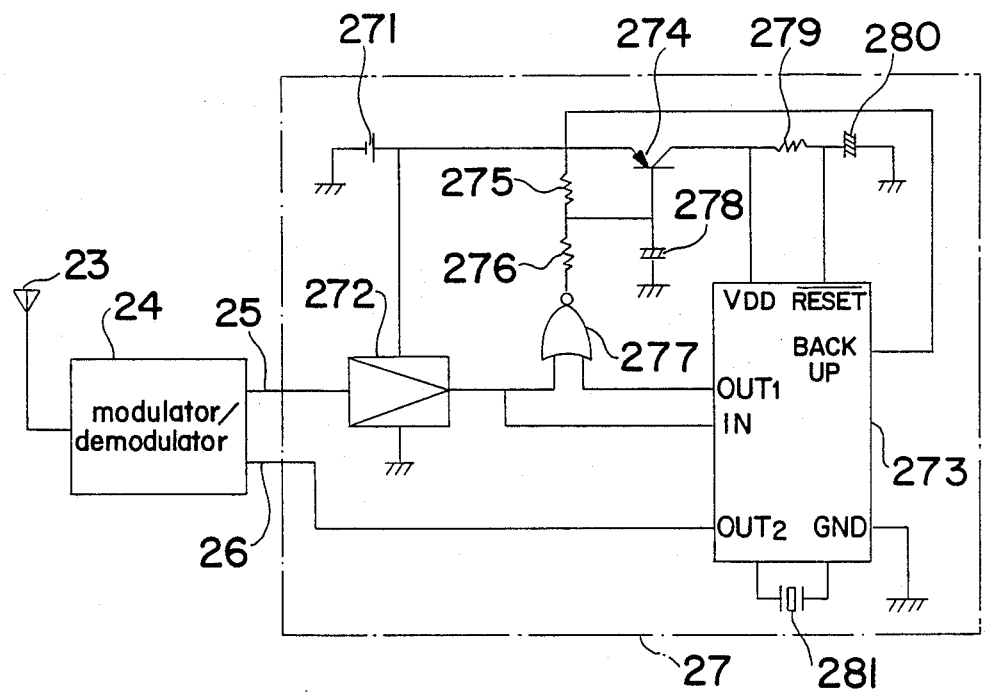
FIG. 3 is an electric circuit diagram of a power-supply built in CPU employed in FIG. 1.
Figure 7:
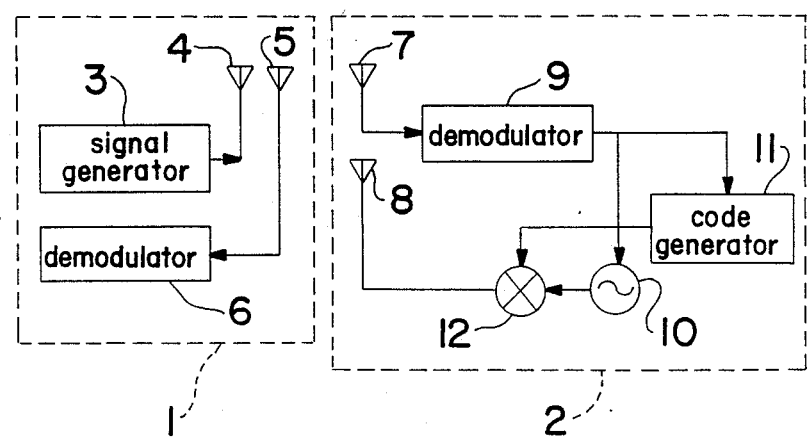
FIG. 7 is a similar diagram to FIG. 1, but, showing a conventional microwave data transmission apparatus already referred above.

One example of the further concrete circuit construction of the power-supply built-in CPU 27 is shown in FIG. 3, which includes a power supply 271 such as a battery, storage battery or the like, an amplifier 272 composed of a C-MOS operation amplifier and so on, a microprocessor 273 for the C-MOS, a transistor 274, resistors 275, 276, 279, a NOR gate 277 for the C-MOS, a capacitor 278, and a vibrator 281 of ceramic, crystal or the like.

In FIG. 3, power is always fed into the back-up terminals of the amplifier 272, the NOR gate 277, and the microprocessor 273. The back-up terminal for the microprocessor 273 is a terminal disposed to retain the memory data stored in an internal RAM. The power consumption by these elements is an extremely small, being about 30 $\mu$W at the most, for a 3 V input power voltage. The amplifier input 272 is amplified up to the voltage level necessary enough to drive the C-MOS NOR gate 277. The LOW level (earth potential) is outputted at a non-signal time from the output terminal. The comparator of the C-MOS, which is not shown, is disposed on the output stage of the amplifier 272.

The waveforms ⓐ through ⓕ in FIG. 4 show the voltage waveforms of each portion of the circuit of the power-supply built-in CPU 27 of FIG. 3. The operation of the power-supply built-in CPU 27 will be described in further detail by the use of the voltage waveform of FIG. 4.

The microwave signal (FIG. 4ⓐ) from the interrogator 101 received by the transceiving antenna 23 is demodulated (FIG. 4ⓑ) by the demodulator and modulator 4, and is fed into the amplifier 272. The transistor 274 in a turn-off state as the two input terminals of the NOR gate 277 are both low in level (earth potential) at the non-signal time. When the microwave signal is received, the output of the amplifier 272 becomes high in level (power-supply potential) by such a power starting signal as shown in FIG. 2, and the output of the NOR gate 277 becomes low in level so that the base voltage of the transistor 274 is reduced in the base voltage to the turn-on state (FIG. 4ⓒ). As a result, the power voltage is applied to the $V_{DD}$ terminal (FIG. 4ⓓ) through the transistor 274 to start generating the clock signals with the oscillation frequency of the vibrator 281 in the microprocessor 273 and the signals moving from the low level into the high level are fed, while the capacitor 280 is being charged, into the resetting terminal to reset the microprocessor 273. The microprocessor 273 starts the operation in accordance with the built-in program from this time point to, first, set the output terminal OUT1 into the high level. As the output terminal of the NOR gate 277 still maintains the low level even if the output of the other input terminal of the NOR gate 277, i.e., the output of the amplifier 272 becomes low in level, the power voltage is fed into the $V_{DD}$ terminal, so that the microprocessor 273 continuously operates. Then, the microprocessor 273 watches the outputs of the amplifier 272 fed into the input terminal IN in accordance with a built-in program. When the controlling signal S2 is judged to be a read control signal, the contents stored within the microprocessor are sequentially drawn out from the output terminal OUT2 of the microprocessor 273 as shown in FIG. 4(f) and are outputted into the demodulator and modulator 4. Also, when the controlling signal S2 is judged to be a write control signal, the write data S3 following the controlling signal is sequentially fed by the input terminal IN and is stored into the memory of the CPU. The data stored in this memory is continuously retained by the power voltage to be applied upon the back-up terminal even after the power supply of the microprocessor 273 has been turned off through the turn-off spate of transistor 274.

After the above-described series of operation are over, the microprocessor 273 returns the output terminal OUT1 to the low level (FIG. 4(e)) in accordance with the built-in program. Thereafter, placed in an idle condition, the two input terminals of the NOR gate 277 both return a low level, and the output of the NOR gate 277 becomes high to turn the transistor 278 off. Accordingly, the microprocessor 273 stops its operation. Although the one embodiment of the power-supply built-in CPU 273 is described hereinabove, the various circuit constructions may be embodied in addition within the range of the present invention.

An example of a automatic identification system for exchanging data by microwave data transmitting apparatus which uses the above-described interrogator and the identification tag will be described hereinafter. This type of apparatus may be used in production control within a factory, for warehouse control, for the gate control of a parking lot, a control for entering or leaving a room, or the like. Specifically in production control within a factory, a small-size identification tag is mounted on each part flowing onto the production line, and an interrogator for reading the memory data of the identification tag is disposed near the line.

The information on each part which comes close to the interrogator is read through the identification tag to control the flowing on the line of the parts in accordance with the information stored therein. The production control of the parts may be precisely performed in this manner.

According to the first embodiment, various signals may be transmitted and received in time series comparison by the use of one type of the working signal frequency only, so that the automatic identification system having many functions may be realized, thus allowing the wider application as well as the extremely practical system may be realized.

Embodiment 2

Figure 5:
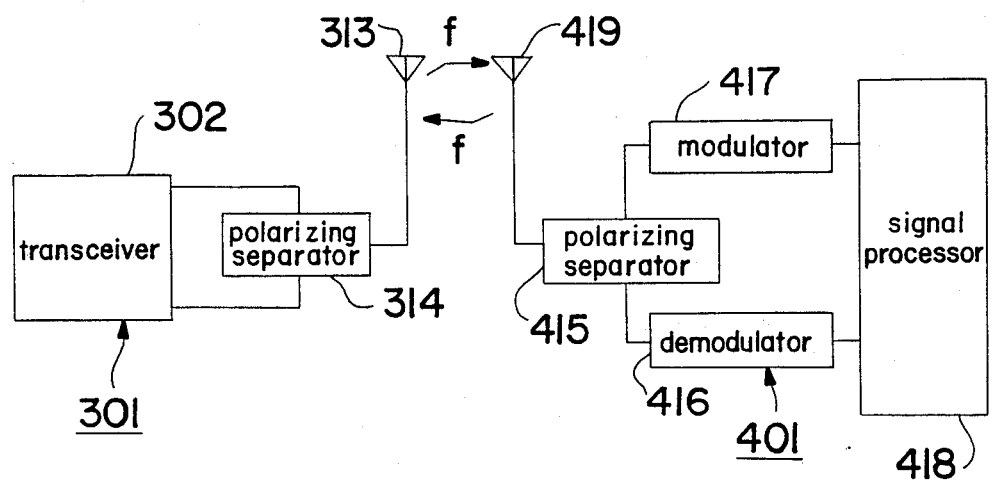
FIG. 5 is a block circuit diagram of a microwave data transmission apparatus in accordance with a second embodiment of the present invention.

FIG. 5 shows a block construction diagram of a second embodiment of a microwave data transmitting apparatus in accordance with the present invention.

Figure 6:
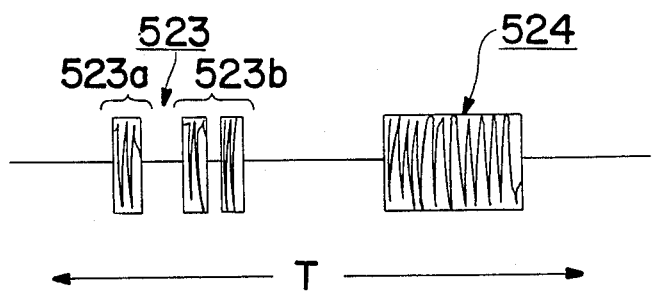
FIG. 6 is a wave-form diagram related to FIG. 5.

In FIG. 5, an interrogation member 301 is provided with a transceiver 302 having a transmitting circuit for transmitting the waveform microwave signal shown in FIG. 6, a polarized wave separating and composing member 314 for transmitting by mutually different first and second polarized waves of the same frequency both the controlling modulation signal 523 and the non-modulation carrier 524 shown in FIG. 6. The mutually different polarized waves are considered, specifically, a combination between the right-hand circularly polarized wave and a left-hand circularly polarized wave, and the combination between a circularly polarized wave and a linearly polarized wave, and the combination between a linearly polarized wave of 0° direction and a linearly polarized wave of 90° direction. A transceiving antenna 313 for transmitting and receiving the microwave signal with respect to the air (or from the air) is connected with the interrogator 301.

Also, an identification tag 401 has therein a polarized detachment composing member 415 for detaching, in accordance with the polarized wave, the microwave signals generated from the interrogator 301, a demodulator 416 for demodulating the controlling modulating signal 523, a modulator 417 for modulating the non-modulation wave 524 to be fed continuously in time series comparison into the controlling modulation signal 523, and a signal processing member 418 composed of a circuit of low power consumption of C-MOS IC and so on for carrying out each type of signal processing operation. Also, a transceiving antenna 419 for transmitting and receiving the microwave signal from the air (or with respect to the air) is connected with the identification tag 401.

The operation of the above-described microwave data transmission apparatus will be described hereinafter in detail.

The microwave non-modulation wave is modulated by the modulating signal as shown in FIG. 6 from the interrogator 301 and is transmitted as the radio wave through the transceiving antenna 313. The modulation signal shown in FIG. 6 has a controlling modulation signal 523 of the first polarized wave direction, for example, the right-hand circularly polarized wave, and the non-modulation wave 524 of the second polarized wave direction, for example, the left-hand circularly polarized wave, and is a signal to be repeatedly appeared with a constant period T. The radio wave transmitted by the transceiving antenna 313 is received by the transceiving antenna 419 on the side of the identification tag 401 when the distance between the interrogator 301 and the identification tag 401 becomes a certain value or lower, and the receiving electric-field level becomes a certain amplitude or higher. The received signal detected by the polarized-wave separating and composing member 415. The controlling modulation signal 523 to be, first, fed is demodulated by the demodulator 416 and thereafter is fed into the signal processing member 418. The signal processing member 418 remains in its idle condition under a condition when the signal from the interrogator 301 is not received. This idle condition means an inoperative condition where the power consumption is of a minimum necessary to retain the information of the RAM inside the signal processing member 418, and power is not fed in many circuits.

When the data information being retained in the identification tag 401 is required, first, to be read under such a condition as described hereinabove, the signal processing member 418 moves into the operating condition if the signal processing member 418 receives form the demodulator 416 the signal 523a for power starting use of the controlling signal 523 of FIG. 6 from the interrogator 301. The processing is recognized to be a reading operation of the data information by the signal detection of the next read instructing signal 23b. The CPU within the signal processor 418 then feeds into the modulator 417 the data informated stored in the RAM by the recognition for the time of the following non-modulation carrier 524. The modulator 417 modulates by the data information the non-modulation carrier 524 received through the polarized-wave separating and composing member 415. The modulated waves are radiated towards the interrogator 301 from the transceiving antenna 419 so that they are received through the polarized-wave separating and composing member 415. The modulated waves are radiated towards the interrogator 301 from the transceiving antenna 419 so that they are received in the interrogator 301 by the transceiving antenna 313. The received waves are detected in the transceiver 302 to draw the data information stored within the signal processing member 418.

In order to change the data information retained in the identification tag 401, the interrogator 301 transmits as radio waves the controlling modulating signals 523 composed of the above-described polarized-wave direction microwave signals through the transceiving antenna 313, thereafter transmits the writing data signals 524', composing of the same first polarized-wave direction microwave signals, as the radio waves from the transceiving antenna 313. When the writing data signals 524' are transmitted as the radio waves from the transceiver antenna 313, the antenna 419 of the identification tag 401 receives the radio waves, and the demodulator 416 demodulates the received signals through the polarized-wave separating and composing member 415 to guide the demodulation signals into the signal processing member 418. At this time, the signal processing member 418 is moved into the operating condition by the reception of the power starting signal 523a of the already preceding modulation signal 523 for control use, and knows that it is adapted to perform the data information changing process by the signal detection of the write instructing signal 523b' so as to re-write the contents of the memory data retained in the internal RAM in accordance with the demodulation signal. Although the example wherein the read instructing signals used from the interrogator 301 during the reading operation is shown in the above-described construction, the read instructing signal may be omitted if the CPU is designed to be read only through the signal 523a for power starting use. Also, one-portion interrogator may be used for exclusive reading use, but all the interrogator may not be employed for both the writing and reading use.

The above-described microwave data transmission apparatus may be applied for the production control within a factory, for warehouse control, gate control of parking lots, and the control for entering and leaving a room by a person having an identification tag. For example, for use in the production control within the factory, a interrogator is mounted on each part, which has the individual data inputted previously in the memory, the data including the code numerals on the production line, the working procedure, the carrying routes, etc. The interrogators are disposed at the major point locations on the production line. The interrogator transmits the microwaves with respect to the identification tag disposed on each part flowing on the production line to read the internal data as described hereinabove to output the control signal for controlling the flow of the line. As the microwaves penetrate plastic and lumber, the identification tag is not particularly required to be disposed on the surface of each part.

According to the second embodiment, the highly functional microwave data transmission system where the identification tag may be made smaller in shape and lighter in weight because of low proper consumption may be provided.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A microwave data transmission apparatus comprising:
    an interrogator including,
        first transmitting means for transmitting modulated microwave signals during a modulation period and non-modulated microwave carrier signals during a non-modulation period, and
        first receiving means for receiving microwave signals; and
    an identification tag including,
        a control processing unit having a built-in power supply, said power supply being periodically rendered operational upon receipt of a power starting signal transmitted during a first sub-period of said modulation period to activate said processing unit,
        a memory portion, and
        transceiving means including second receiving means for receiving the modulated microwave signals sent from said interrogator during a second sub-period of said modulation period and for receiving said non-modulated microwave carrier signals sent during said non-modulation period, and second transmitting means including modulating means for modulating said received non-modulated microwave carrier signals with data stored in said memory portion to provide return microwave signals for transmission back to said interrogator.

2. A microwave transmission apparatus comprising:
    an interrogator including,
        transmitting means for transmitting modulated microwave signals and non-modulated microwave carrier signals having in time sequence a period of mutually different first and second type polarizations during a modulation period and non-modulation period, respectively, and
        receiving means for receiving microwave signals of said second type polarization; and
    an identification tag including,
        a signal processor periodically being rendered operational upon receipt of a power starting signal during a first portion of said first type polarization transmission from said interrogator, said power starting signal activating said signal processor,
        a memory, and transceiver means for detecting the modulated microwave signals of said first type polarization and the non-modulated microwave carrier signals of said second type polarization received from said interrogator and for modulating said non-modulated microwave carrier signal based on data in said memory to provide a return modulation signal for transmission to said interrogator, said return modulation signal being microwave signals of said second type polarization, wherein said first and second type polarizations comprise mutually different type circular polarizations.

3. The apparatus as defined by claim 2 wherein said circular polarization types includes right-hand and left-hand circular polarizations.

4. A microwave data transmission apparatus comprising:
   an interrogator including,
      transmitting means for transmitting in time series a modulation signal and a non-modulation carrier signal, said modulation signal having a frequency f and a first polarization, said non-modulation carrier signal having said frequency f and a second polarization, and
      receiving means for receiving a modulation signal having said frequency f and said second polarization; and
   a responder including,
      detection means for detecting said modulation signal having said frequency f and said first polarization which is outputted from said interrogator,
      a memory portion,
      modulation means for modulating said non-modulation carrier signal based upon data stored in said memory portion to create a return signal, said return signal having said frequency f and said second polarization, and
      transmitting means for transmitting said return signal to said interrogator.

5. The apparatus as defined by claim 4 wherein said first and second polarizations comprise mutually different type circular polarizations.

6. The apparatus as defined by claim 4 wherein one of said first and second polarizations comprises a circular polarization and the other of said polarizations comprises a linear polarization.

7. The apparatus as defined by claim 4 wherein said first and second polarizations comprise mutually different type linear polarizations.

8. The apparatus as defined by claim 7 wherein one of said mutually different type linear polarizations comprises a 0 direction linear polarization and the other of said mutually different type polarizations comprises a 90 direction linear polarization.

9. The apparatus as defined in claim 4 wherein said responder further includes a control processing unit having a built-in power supply, said power supply being periodically rendered operational upon receipt of a power starting signal transmitted from said interrogator during a sub-portion of said modulation signal.

* * * * *